United States Patent [19]

Harshberger, Jr. et al.

[11] Patent Number: 4,775,788
[45] Date of Patent: Oct. 4, 1988

[54] APPARATUS FOR DETECTING POSITION OF A ROTATING ELEMENT USING A TWO-GRATING MOIRE PATTERN

[75] Inventors: Robert P. Harshberger, Jr., San Jose; Bryan E. Loucks, Los Altos Hills; Kenneth G. Witte, San Jose, all of Calif.

[73] Assignee: Greyhawk Systems, Inc., Milpitas, Calif.

[21] Appl. No.: 915,072

[22] Filed: Oct. 3, 1986

[51] Int. Cl.⁴ .............................. H01J 3/14; H01J 5/16
[52] U.S. Cl. ................................. 250/235; 250/237 G
[58] Field of Search .......... 250/235, 234, 236, 237 G, 250/237 R; 358/293, 294

[56] References Cited

U.S. PATENT DOCUMENTS

| | | | |
|---|---|---|---|
| 3,427,463 | 2/1969 | Weyrauch | 250/237 G |
| 3,732,424 | 5/1973 | Wojtulewicz | 250/235 |
| 4,025,796 | 5/1977 | Erdmann | 250/237 R |
| 4,178,064 | 12/1979 | Mrdjen | 250/235 |

Primary Examiner—David C. Nelms
Assistant Examiner—William L. Oen
Attorney, Agent, or Firm—Flehr, Hohbach, Test, Albritton & Herbert

[57] ABSTRACT

The position and motion of a rotating element is determined by using a two-grating moire pattern. Movement of the element causes a projected scale image representing radiation reflected from the element to shift relative to a fixed grating thereby generating moire fringes. The accumulated fringes serve to measure absolute position and motion of the element.

6 Claims, 4 Drawing Sheets

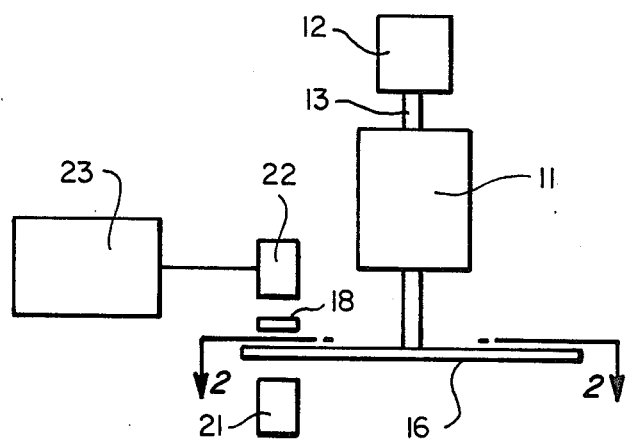
FIG_1
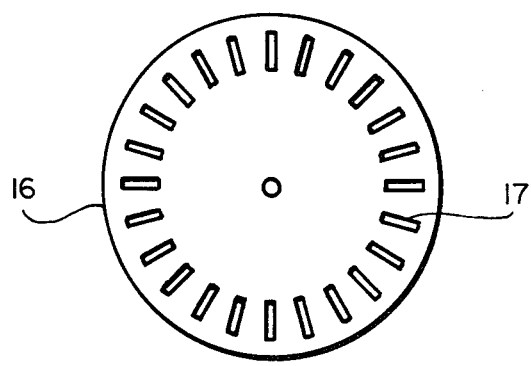
FIG_2
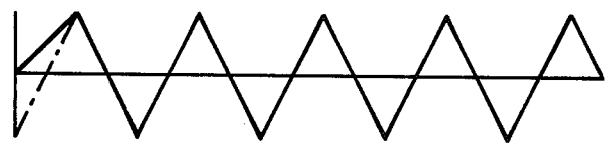
FIG_3

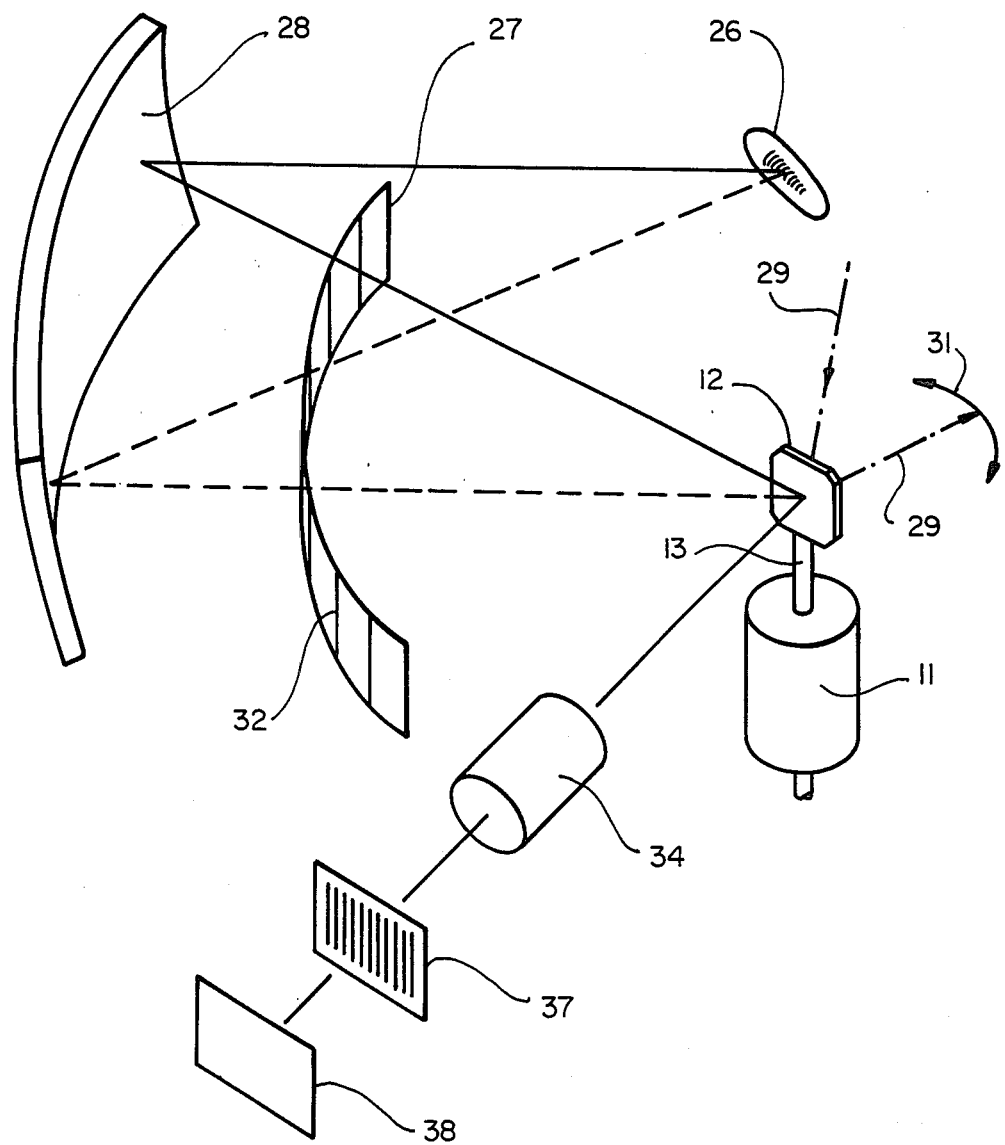
FIG_4

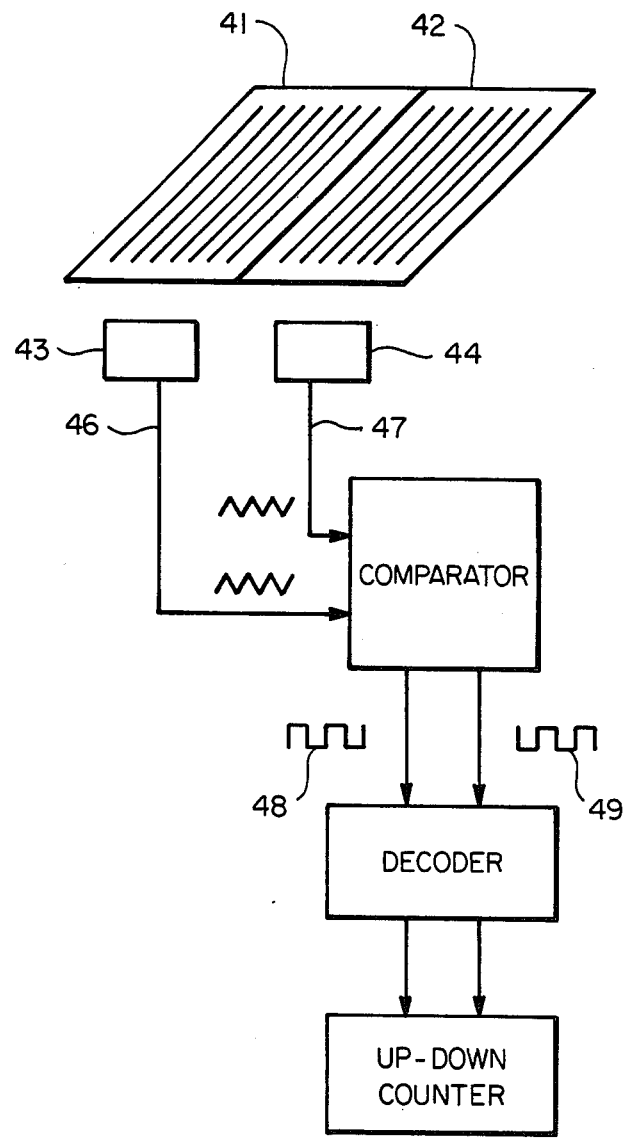
FIG_5

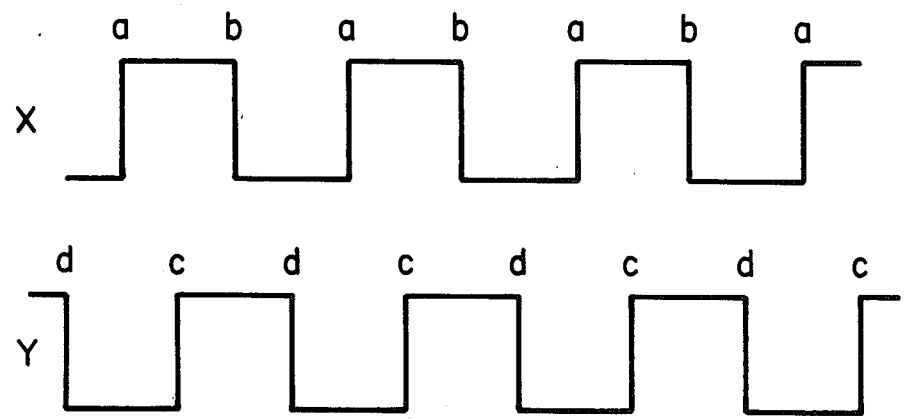
*FIG_6A*
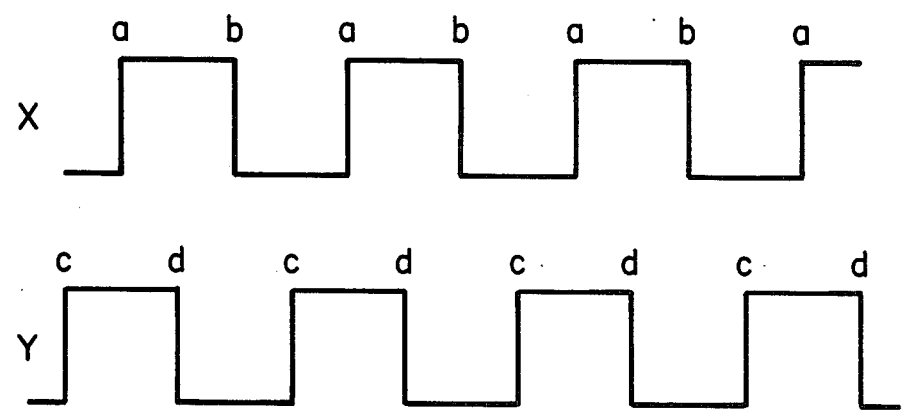
*FIG_6B*

APPARATUS FOR DETECTING POSITION OF A ROTATING ELEMENT USING A TWO-GRATING MOIRE PATTERN

This invention relates to an apparatus and method for determining the position of a rotating element and more particularly to an apparatus and method for determining the position of a galvanometer shaft.

Various systems use light sources and light responsive devices for registration of data and data display. These systems incorporate finely focused light beams or laser beams that are employed for scanning and addressing light responsive surfaces. The scanning pattern can be along a single dimension, or over two dimensions of an X-Y plane, for example. When the beam is moved relative to the light receiving surface, it is generally necessary to determine accurately the position of the moving beam.

For example, in liquid crystal display technology, a scanning laser beam is used to thermally write on a high resolution liquid crystal light valve. Such displays can be selectively erased at a writing speed determined in part by the scanning speed of the beam. In another application, laser beams are used to scan photoresist for forming circuit board wiring configurations. In these types of applications, it is necessary to detect precisely the position of the beam.

Electromechanical galvanometer scanner systems have been used in the past to scan a laser light beam. The galvanometer systems incorporate a mirror for reflecting the laser beam in combination with a galvanometer for rotating the mirror. In one implementation, the position of the galvanometer shaft and the mounted galvanometer mirror can be determined by using a capacitance-based sensor, which consists of four electrodes surrounding an electrically grounded rotor. Movement of the galvanometer rotor produces differential currents in opposing electrode pairs, thereby generating a signal that is proportional to position. However, this approach does not take into account the flexing of the mirror or the shaft, the mechanical motion of the shaft axis, or any distortions which may be introduced by optical elements included in the galvanometer assembly. In addition, the speed of response to the galvanometer rotor movement is limited because of the added mass.

Another approach is to use an interferometric method wherein a coherent laser beam is reflected from a galvanometer mirror. The reflected light is modulated as the galvanometer mirror is moved. The spatial frequency of a grating determines the positional resolution. However, the disadvantage of interferometric methods is that they require coherent light, and therefore are expensive. In addition, such systems have less reliability than those using simple incoherent sources such as incandescent lamps.

Still another approach is to support a first grating on the rotatable member and a second grating mounted so that it is spaced from the first grating. Each grating includes transparent and opaque regions. Light is projected through the gratings and a photodetector senses the light which passes through the gratings. As the gratings move with respect to one another, a moire pattern is formed with the transmitted light increasing and decreasing in intensity depending upon whether the transparent and opaque regions overlap or are interleaved. The frequency of the output signal is a measure of the relative velocity and the number of cycles is a measure of the relative distance moved. A major problem with the prior art is that the gratings or other elements are generally mounted for movement with the moving or rotating member. This adds mass and increases the inertia of the movable member inhibiting its performance.

It is a general object of the present invention to provide a position sensor for sensing the position of a rotatable element which employs light reflected from the movable element rather than including an additional element mounted for rotation therewith.

In accordance with the invention, the position of a rotating shaft such as a galvonometer shaft is sensed by means of a two-grating system that provides a moire or fringe pattern.

In accordance with another feature of the present invention, the movable member includes a reflecting surface which reflects a pattern of a first fixed grating onto a second fixed grating where light is passed or intercepted by the second fixed grating depending on whether the light falls in the opaque or transparent regions of the second fixed grating.

The foregoing and other objects of the invention will be more clearly understood with reference to the accompanying drawings in which:

FIG. 1 is an elevational view of a prior art shaft position detecting apparatus.

FIG. 2 is a view taken along the lines 2—2 of FIG. 1.

FIG. 3 illustrates the waveform that the position sensor of FIG. 1 produces.

FIG. 4 is an isometric view of a position sensing apparatus in accordance with the present invention.

FIG. 5 is a block diagram of the electrical system associated with the apparatus of FIG. 4 which serves to provide information regarding position and velocity of the rotating shaft.

FIG. 6 shows the waveforms at the output of the comparator of FIG. 5.

FIGS. 1–3 illustrate a prior art method of determining the rotational position of a rotating shaft or element. In FIG. 1 a galvanometer 11 drives a mirror 12 via the shaft 13. The shaft extends outwardly from the galvanometer and serves to support a disc 16 which rotates with the shaft. The disc 16 includes a pattern of spaced transparent and opaque regions on its periphery. The disc may be a transparent disc with opaque regions 17. A fixed grating 18 is positioned adjacent to the disc 16 and includes a pattern of opaque regions identical in spacing to that of the regions 17 in the periphery of the disc. A light source 21 projects a beam through the transparent disc and grating to a detector 22. The detector 22 is connected to an electrical system 23 which processes the received signals and provides an output which gives an indication of the position of the disc and associated shaft. The output from the detector 23 is shown in FIG. 3 as being a triangular waveform with minimum transmission when the opaque portions of the disc cover the transparent portions of the grating and maximum output when the transparent portions of the disc and grating are aligned. The spatial frequency or spacing of the opaque and transparent regions is chosen to provide the desired angular resolution.

The disadvantage of apparatus in accordance with the prior art as illustrated in FIGS. 1, 2 and 3 is that it substantially increases the angular momentum of the galvanometer shift and mirror assembly and consequently substantially reduces the speed at which the mirror and shaft assembly may be accelerated and decelerated. For certain applications such as in a two axis random accessing scheme such as that described in copending application Ser. No. 861,492, it is desirable to reduce the mass of the mirror shaft assembly as much as possible to provide for increased speed and resolution.

FIG. 4 shows an embodiment of the present invention. A light source 26 is located so that it illuminates concave mirror 28. A first grating 27 is positioned such that the light from the source 26 which is reflected by the concave mirror 28 passes through the grating and projects an image of the grating onto the polished rear surface of the galvanometer mirror 12. The front reflecting face of the galvanometer mirror serves to receive laser beam 29 and reflects and scans the beam as shown by arrow 31. The beam can be scanned responsive to a control signal to scan an associated liquid crystal cell or the like.

The grating or scale consists of transparent substrate with opaque lines 32 having a spatial frequency determined by the degree of resolution desired for the position detector. The image of the scale that is projected on the mirror 12 is reflected into a projection lens 34 which performs the function of collecting and focusing the reflected image of the grating 27 onto the second grating 37. A photodetector 38 receives the light which passes through the grating 37.

Referring to FIG. 5, the grating 37 consists of two sections: 41 and 42, each of which consists of regularly alternating transparent and opaque areas having the same spatial frequency but at a spatial phase difference of 90° as the image of the grating 27. Photodetector 38 consists of two separate detectors 43 and 44 located immediately adjacent to the sections 41 and 42, respectively.

The photodetectors may be photodiodes which receive the light transmitted through the grating.

The output signals 46 and 47 generated by the detectors 43 and 44 are a function of the light that passes through the scale sections 41 and 42, respectively. The effect of this arrangement is such that the image of both gratings 27 and 37 are superimposed and focused upon the detectors.

When the galvanometer mirror moves, it reflects a different portion of the image of grating 27 onto grating 37. This has the effect of causing alternating dark and light areas to pass across the grating 37. When the light areas are aligned with the opaque areas of the scale, the light that reaches the detectors is minimum. When the light areas of the image or scale are aligned with the transparent portions of the grating 37, maximum light reaches the detectors. The amplitude of the light reaching the detectors varies in a triangular pattern in the manner aforementioned. The number of cycles of light to dark is a measure of the number of elements of the grating that have passed a given point on the grating, that is, a measure of the rotation and the frequency of the cycles is a measure of the velocity of movement of the mirror 12.

The direction of movement of the mirror may be determined by quadrature effects which are best described with reference to FIGS. 5 and 6. Referring to FIG. 5, the scale consists of two sections: 41 and 42. Each section consists of regularly alternating transparent and opaque areas having a spatial frequency determined by the resolution desired for the detector. Sections 41 and 42 are spatially located 90° or 270° out of phase with respect to one another, that is, the signal 46 generated by the photodetector 42 which is positioned adjacent to the section 41 is 90° out of phase with the signal 47 generated by photodetector 44 which is located adjacent the area 42. The signals are supplied to a comparator circuit 51. This type circuit is well known and effectively converts signals 46 and 47 to squarewaves 48 and 49 while retaining the original frequency and phase relationship. A decoder receives the two signals and determines the direction of travel. This is more clearly illustrated in FIGS. 6A, 6B. FIG. 6A shows the waveform for rotation of the shaft in a first direction while FIG. 6B shows the signal for rotation of the shaft in the opposite direction. The letters a, b, c and d show the rising or falling portions of the rectangular waves. The direction of motion is determined as follows:

Direction 1  $a \cdot Y + b \cdot Y + c \cdot X + d X$
Up Count
Direction 2  $a \cdot Y + b \cdot Y + c \cdot X + d \cdot X$
Down Count where
. = logical "and"
+ = logical "or"
− = low for X or Y and falling for a, b, c, or d.
no bar = high for X or Y and rising for a, b, c, or d.

When the transitions are sorted as above, the output of the comparator is applied to an up-down counter with separate clocks. The parallel clock output will represent the relative net motion of the mirror in either direction. The output of the up-down counter can be used as a feedback signal to control the galvanometer 10 and, therefore, the position of the mirror whereby the deflection of the beam 29 is controlled.

The two-grating system disclosed herein enables the use of an incandescent lamp as a light source and thus a position sensor that is relatively simple and inexpensive when compared to interferometric methods presently used. Errors due to the shaft and mirror deflection are virtually eliminated. The system disclosed herein being simple and compact in design affords easy alignment and relatively low temperature sensitivity. The galvanometer of the present invention enables precise determination of the instantaneous position of the light beam 29, thereby allowing adjustment of the position of the galvanometer and reflecting face of the mirror connected to the shaft. In this way, the light beam which is reflected from the mirror can be translated and directed to the desired location of a surface being scanned.

What is clamed is:

1. Apparatus for detecting the position of a rotatable element comprising:
   mirror means connected to said element to rotate therewith;
   a source of light;
   a first fixed grating having a regular pattern of areas that are transparent and opaque to the radiation from said source having a first spatial frequency;
   a second fixed grating having two sections each including a pattern of areas that are transparent and opaque to the radiation of said light source said patterns having the same spatial frequency but having a spatial phase difference of ninety degrees with respect to one another;
   means for projecting an image of said first grating onto said second grating, said means including said mirror means and arranged such that the pattern from said first grating moves across said second grating at a rate proportional to the rate of motion of said mirror whereby the intensity of light passing through said two sections of said second grating varies in a regular pattern proportional to the rate of motion of said mirror;

detector means located behind each of said two sections of the second grating such that light passing through said sections of said second grating falls thereon, each of said detector means being adapted to produce electrical signals proportional to the intensity of light passing through said sections of said second grating and means for processing said electrical signals to produce a mirror position and motion signal.

2. A system as in claim 1, in which said means for processing said electrical signals includes comparator means for receiving said signals and generating square-wave signals, decoder means for decoding said square-waves and a counter connected to receive the output of the decoder and generate a position and motion signal.

3. A system as in claim 2, wherein said pattern sensing means comprises photodetectors.

4. A system as in claim 1, wherein said source of light is an incandescent lamp.

5. A system as in claim 1, further including a concave mirror for reflecting the light from said incandescent lamp through said first fixed grating onto said mirror means.

6. A system as in claim 1, where said mirror means comprises a galvanometer mirror.

* * * * *